(12) United States Patent
Lee

(10) Patent No.: US 10,755,696 B2
(45) Date of Patent: Aug. 25, 2020

(54) SPEECH SERVICE CONTROL APPARATUS AND METHOD THEREOF

(71) Applicant: Wistron Corporation, New Taipei (TW)

(72) Inventor: Chin-Lung Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 198 days.

(21) Appl. No.: 16/018,066

(22) Filed: Jun. 26, 2018

(65) Prior Publication Data

US 2019/0287518 A1 Sep. 19, 2019

(30) Foreign Application Priority Data

Mar. 16, 2018 (TW) .............................. 107108937 A

(51) Int. Cl.

| | |
|---|---|
| *G10L 15/08* | (2006.01) |
| *G10L 15/22* | (2006.01) |
| *G10L 25/78* | (2013.01) |
| *G10L 15/06* | (2013.01) |
| *G10L 15/28* | (2013.01) |
| *G10L 15/30* | (2013.01) |

(52) U.S. Cl.
CPC ............ *G10L 15/08* (2013.01); *G10L 15/063* (2013.01); *G10L 15/22* (2013.01); *G10L 15/28* (2013.01); *G10L 15/30* (2013.01); *G10L 2015/0636* (2013.01); *G10L 2015/088* (2013.01); *G10L 2025/786* (2013.01)

(58) Field of Classification Search
CPC .... G10L 15/08; G10L 15/22; G10L 2025/786
See application file for complete search history.

(56) References Cited

U.S. PATENT DOCUMENTS

| | | | |
|---|---|---|---|
| 2006/0200347 A1* | 9/2006 | Kim .................... | G10L 15/22 704/236 |
| 2006/0293886 A1* | 12/2006 | Odell .................... | G10L 15/08 704/231 |

(Continued)

OTHER PUBLICATIONS

"Office Action of Taiwan Counterpart Application", dated Dec. 17, 2018, p. 1-p. 12.

(Continued)

*Primary Examiner* — Bryan S Blankenagel
(74) *Attorney, Agent, or Firm* — JCIPRNET

(57) ABSTRACT

A speech service control apparatus and a method thereof are provided. Speech data is obtained, and a keyword in the speech data is recognized to determine a confidence value corresponding to the keyword, which is a match level of the keyword relative to a wakeup keyword to request for speech services. When the confidence value is inferior to a recognized threshold, a number of cumulative failures is determined. The speech services are requested because the confidence value is greater than the recognized threshold, and the number of cumulative failure is a cumulative number accumulated when the speech data and previous speech data are inferior to the recognized threshold within a time period. The recognized threshold is modified according to the number of cumulative failure, a calculation relationship of confidence values of the speech data and the previous speech data, to enable the speech services successfully.

18 Claims, 2 Drawing Sheets

(56) References Cited

U.S. PATENT DOCUMENTS

| | | | |
|---|---|---|---|
| 2007/0192101 A1 | 8/2007 | Braho et al. | |
| 2012/0209609 A1* | 8/2012 | Zhao | G10L 15/08 704/249 |
| 2013/0132078 A1* | 5/2013 | Arakawa | G10L 15/04 704/233 |
| 2013/0185068 A1* | 7/2013 | Tanaka | G10L 15/08 704/233 |
| 2014/0163978 A1* | 6/2014 | Basye | G10L 15/28 704/233 |
| 2014/0337031 A1 | 11/2014 | Kim et al. | |
| 2017/0047079 A1* | 2/2017 | Hiroe | G10L 25/78 |
| 2017/0125036 A1* | 5/2017 | Wang | G10L 17/02 |
| 2017/0324866 A1 | 11/2017 | Segre et al. | |
| 2018/0090136 A1* | 3/2018 | Connell, II | G06F 40/20 |
| 2018/0144740 A1 | 5/2018 | Laroche et al. | |

OTHER PUBLICATIONS

"Search Report of Europe Counterpart Application", dated Oct. 1, 2018, p. 1-p. 6.

Janne Suontausta et al., "Fast Decoding in Large Vocabulary Name Dialing", IEEE International Conference, Jun. 2000, pp. 1535-1538.

\* cited by examiner

SPEECH SERVICE CONTROL APPARATUS AND METHOD THEREOF

CROSS-REFERENCE TO RELATED APPLICATION

This application claims the priority benefit of Taiwan application serial no. 107108937, filed on Mar. 16, 2018. The entirety of the above-mentioned patent application is hereby incorporated by reference herein and made a part of this specification.

BACKGROUND OF THE DISCLOSURE

Field of the Disclosure

The disclosure relates to a voice control technique, and particularly relates to a speech service control apparatus and a method thereof based on the voice control technique.

Description of Related Art

In recent years, various network service providers have provided speech assistants and related speech services thereof in succession, and home appliance manufacturers also have provide home appliances with a voice control function. In addition, other electronic equipment suppliers also integrate their products with the voice control function to allow users to control operation behaviours (for example, to turn on a power, broadcast weather, play music, etc.) of various types of electronic devices through voice control. In order to meet user's needs and improve product utility, some practitioners even open related source codes to allow third-party developers to be able to customize services or integrate with peripheral application services. In these source codes, the developers may set their own wakeup keywords (for example, Alexa, Cortana, Hey Siri, OK Google, etc.) to make a request on a server or a program through a specific keyword, so as to obtain a corresponding speech service.

However, users of different regions may have different pronunciations and accents on the wakeup keyword, and different voice control devices (for example, a computer, a mobile phone, a smart loudspeaker, etc.) probably use different speech receiving devices (for example, a microphone) or different speech receiving algorithms to recognize speech data, so that the same user saying the same wakeup keyword to different voice control devices may cause different results (for example, the user calling a device A may successfully acquire the corresponding speech service, but the user calling a device B cannot successfully send a request). Therefore, the existing speech service control technique still has defects.

SUMMARY OF THE DISCLOSURE

The disclosure is directed to a speech service control apparatus and a method thereof, in which by learning user's several calls for a wakeup keyword, failure of enabling a speech service is effectively avoided.

The disclosure provides a speech service control method including following steps: obtaining speech data; recognizing a keyword in the speech data to determine a confidence value corresponding to the keyword, wherein the confidence value is a match level of the keyword relative to a wakeup keyword to request for a speech service; determining a number of cumulative failures in response to a determination that the confidence value is inferior to a recognition threshold, wherein the speech service is requested when it is determined that the confidence value is greater than the recognition threshold, and the number of cumulative failures is a cumulative number accumulated when the confidence values of the speech data and at least one previous speech data are inferior to the recognition threshold within a time period; modifying the recognition threshold according to the number of cumulative failures and a calculation relationship of the confidence values of the speech data and the previous speech data.

The disclosure provides a speech service control apparatus including a speech receiving device and a processor. The speech receiving device receives speech data. The processor is coupled to the speech receiving device, and is configured to execute following steps: recognizing a keyword in the speech data to determine a confidence value corresponding to the keyword, wherein the confidence value is a match level of the keyword relative to a wakeup keyword to request for a speech service; determining a number of cumulative failures in response to a determination that the confidence value is inferior to a recognition threshold, wherein the speech service is requested when the confidence value greater than the recognition threshold is determined, and the number of cumulative failures is a cumulative number accumulated when the confidence values of the speech data and at least one previous speech data are inferior to the recognition threshold within a time period; modifying the recognition threshold according to the number of cumulative failures and a calculation relationship of the confidence values of the speech data and the previous speech data.

Based on the above description, the recognition threshold is an important key to enable the speech service, and in the speech service control apparatus and the method thereof of the disclosure, in response to multiple unsuccessful requests for the speech service, the recognition threshold is decreased based on the confidence values corresponding to the voice data of the several failed requests, such that a subsequent call of the user is able to successfully request for the speech service. On the other hand, if the user does not call but the speech service is successfully requested, the embodiment of the disclosure is adapted to be properly increase the recognition threshold such that an external sound is hard to successfully request for the speech service.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
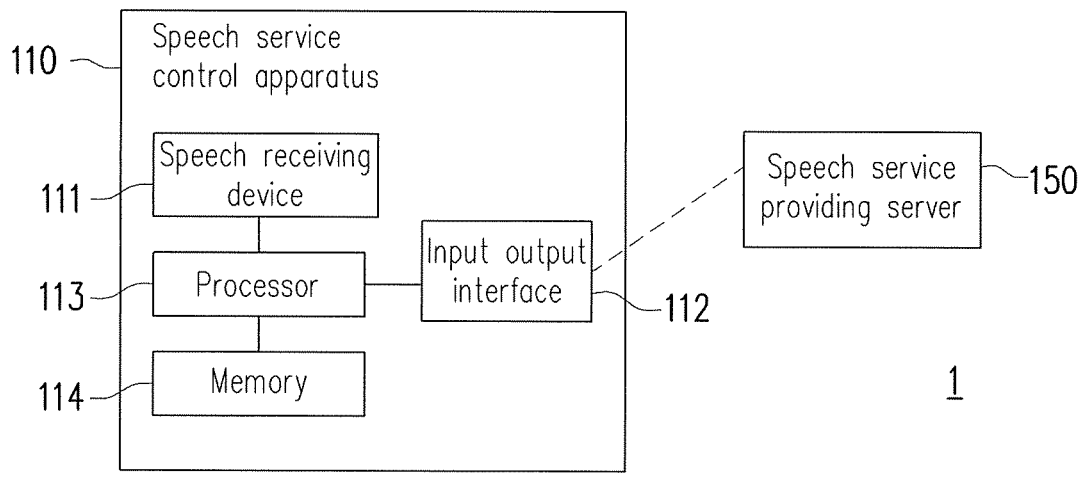
FIG. 1 is a schematic diagram of a speech service system according to an embodiment of the disclosure.

FIG. 1 is a schematic diagram of a speech service system 1 according to an embodiment of the disclosure. Referring to FIG. 1, the speech service system 1 includes a speech service control apparatus 110 and a speech service providing server 150.

The speech service control apparatus 110 may be a smart phone, a tablet personal computer (PC), a desktop computer, a notebook, a voice assistant, a smart multimedia device, a smart loudspeaker, or a smart home appliance, etc., the speech service control apparatus 110 includes but not limited to a speech receiving device 111, an input output interface 112, a processor 113 and a memory 114.

The speech receiving device 111 includes but not limited to an omnidirectional microphone, a directional microphone or other electronic element adapted to transform a voice wave (for example, a human voice, an environmental sound, a machine operation sound, etc.) into an audio signal, an analog-to-digital converter (ADC), a filter, and an audio processor, and in the present embodiment, the speech receiving device 111 generates digital speech data (or referred to as audio data) in response to reception of the voice wave.

The input output interface 112 may be a network interface card supporting a communication technique such as Wi-Fi, mobile communication, Ethernet, etc., or a transmission interface such as various types of serial or parallel bus, etc., and in the present embodiment, the input output interface 112 receives and transmit data from/to external objects.

The processor 113 is coupled to the speech receiving device 111 and the input output interface 112, and the processor 113 may be a Central Processing Unit (CPU), or other programmable general purpose or special purpose microprocessor, a Digital Signal Processor (DSP), a programmable controller, an Application-Specific Integrated Circuit (ASIC) or other similar devices or a combination of the above devices. In the present embodiment, the processor 113 is used for executing all of operations of the speech service control apparatus 110, and is adapted to obtain and process the speech data generated by the speech receiving device 111, and transmit data through the input output interface 112.

The memory 114 is coupled to the processor 113, and the memory 114 may be any type of a fixed or movable Random Access Memory (RAM), a Read-Only Memory (ROM), a flash memory or a similar device or a combination of the above device. The memory 114 is used for storing a software program used for executing a speech service control method (which is described later in a subsequent embodiment) of the disclosure, related speech data and related values (for example, confidence values, a recognition threshold, various variation values, a highest threshold, etc., which are described later in the subsequent embodiment), a confidence value-related equation, etc., and the software program, data, values and equation may be loaded and executed by the processor 113.

The speech service providing server 150 may be a personal computer, a notebook, a work station or various types of server. The speech service providing server 150 receives a service request, and recognizes speech data in the service request based on a voice-to-text and semantic analysis technique, so as to interpret content of the service request. The speech service providing server 150 determines whether the content of the service request is matched to a speech function thereof (for example, keyword inquiry, playing music, calendar reminding, etc.), so as to provide the corresponding speech service.

Figure 2:
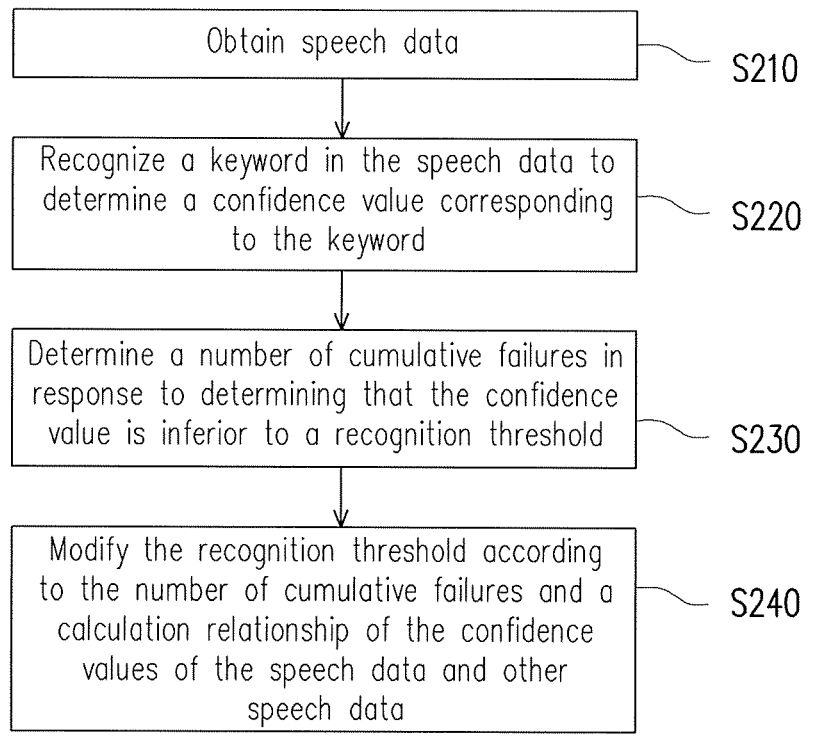
FIG. 2 is a flowchart illustrating a speech service control method according to an embodiment of the disclosure.

In order to facilitate understanding an operation flow of the disclosure, a plurality of embodiments is provided below for detailed description. FIG. 2 is a flowchart illustrating a speech service control method according to an embodiment of the disclosure. Referring to FIG. 2, in the following description, the method of the embodiment of the disclosure is described below with reference of various components and modules in the speech service control apparatus 110 of FIG. 1. The flow of the method may be adjusted according to an actual implementation, which is not limited by the disclosure.

The processor 113 obtains speech data through the speech receiving device 111 (step S210), and recognizes a keyword in the speech data to determine a confidence value corresponding to the keyword (step S220). In the present embodiment, the processor 113 recognizes the speech data by using the voice-to-text and semantic analysis technique, so as to obtain sentence content of the speech data. The processor 113 detects whether the sentence content is or is complied with a specific wakeup keyword (for example, Alexa, Cortana, Hey Siri, OK Google, etc.), and the specific wakeup keyword is a requirement to activate a request procedure for the speech service. However, the sentence content recognized by the processor 113 inevitably has some errors. Therefore, the processor 113 requires to first determine a match level of the sentence content relative to the wakeup keyword (i.e., the confidence value, which is generally between 0 and 1), and then determines whether to provide a service request. It is assumed that the speech receiving device 111 receives a voice wave produced by the user when the user calls the wakeup keyword, and the speech data converted from the voice wave may include a keyword (included in the sentence content) related to the wakeup keyword. The processor 113 further determines a match level of the keyword relative to the wakeup keyword to serve as the confidence value of the present speech data.

It should be noted that the confidence value is an important key for determining whether the processor 113 sends the service request. The processor 113 determines whether the confidence value of the present speech data is greater than a recognition threshold (which is between 0 and 1, for example, 0.6, 0.55, etc.). If the confidence value is greater than the recognition threshold, the processor 113 sends the service request. Conversely, if the confidence value is inferior to the recognition threshold, the processor 113 does not send (or neglects, disables) the service request. In the existing technique, the recognition threshold is fixed. Therefore, if the user cannot successfully make a voice control device to provide services by calling the wakeup keyword, even if the user repeatedly calls the wakeup keyword, the existing voice control device probably still cannot send the service request due to a determination that the corresponding confidence value is inferior to the fixed recognition threshold.

In order to resolve the aforementioned problem, in the embodiment of the disclosure, several calls of the user for the wakeup keyword are trained to learn the confidence values corresponding to the user's calls, and then modify the recognition threshold according to the aforementioned confidence values, which is described in detail below.

The processor 113 determines a number of cumulative failures in response to the determination that the confidence value is inferior to the recognition threshold (step S230). The number of cumulative failures is a cumulative number accumulated when the confidence values of the present speech data and at least one previous speech data are inferior to the recognition threshold within a time period (for example, 3 seconds, 5 seconds, etc.), where each time when the processor 113 determines that the confidence value of the present speech data is inferior to the recognition threshold, the processor 113 adds the number of cumulative failures by one.

It should be noted that in some embodiments, the number of cumulative failures is a cumulative number accumulated when the confidence values of the speech data and at least one previous speech data obtained in succession are inferior to the recognition threshold within the time period. Namely, the processor 113 has to continuously detect the user calls the wakeup keyword before cumulating the number of cumulative failures. However, in some actual applications, the user probably unintentionally adds other sentence content other than the wakeup keyword in certain several calls, such that the user has to repeatedly call the wakeup keyword for several times. Therefore, the continuous detection mechanism is rather strict but is adapted to avoid misjudgement, and a practitioner of the embodiment of the disclosure may determine whether the condition of continuity is required according to an actual application. On the other hand, each time when a certain time period is ended, the processor 113 sets the number of cumulative failures to zero, so as to recount the number of cumulative failures.

The processor 113 modifies the recognition threshold according to the number of cumulative failures and a calculation relationship of the confidence values of the speech data and the previous speech data (step S240). To be specific, the processor 113 may determine whether the present number of cumulative failures is greater than a times threshold (which is an integer greater than 1, for example, 2, 3, 5, etc.). The processor 113 continually recognizes the subsequent speech data in response to that the number of cumulative failures is not greater than the times threshold. The processor 113 decreases the recognition threshold according to the calculation relationship of the confidence values of the speech data and the previous speech data in response to the determination that the number of cumulative failures is greater than the times threshold.

In an embodiment, the processor 113 obtains at least one (for example, two, three, etc.) maximum confidence value in the confidence values of the speech data and several batches of previous speech data, and takes an average of the confidence values of at least one of the speech data and the several batches of previous speech data (i.e. the obtained at least one of the maximum confidence values) and the recognition threshold as a modified recognition threshold. Since the confidence values of the speech data and the several batches of previous speech data are all inferior to the initial recognition threshold, the average of the confidence values and the initial recognition threshold obtained by the processor 113 may be inferior to the initial recognition threshold, so that the recognition threshold is decreased. For example, the confidence values are 0.5, 0.56, 0.45, 0.3, the processor 113 averages two of the maximum confidence values 0.5 and 0.56 with a present recognition threshold 0.6 to obtain 0.53 to serve as the modified recognition threshold.

Further, in another embodiment, the processor 113 obtains at least one of the confidence values of the speech data and the previous speech data that is greater than a lowest threshold, where the lowest threshold is equal to the recognition threshold minus a first variation value (which is between 0 and 1, for example, 0.05, 0.08, etc.). Then, the processor 113 may directly take an average of the above confidence values and the recognition threshold or take an average of at least one maximum confidence value thereof and the recognition threshold as the modified recognition threshold. For example, it is assumed that the confidence values are 0.2, 0.5, 0.56, 0.45, 0.3, and the lowest threshold is the recognition threshold 0.6 minus the first variation value 0.05, which is 0.55, and the processor 113 selects the confidence value 0.56 that is greater than the lowest threshold 0.55, and averages the confidence value 0.56 with the present recognition threshold 0.6 to obtain 0.58 to serve as the modified recognition threshold. A characteristic of the embodiment is to further set a lowest threshold of the confidence values, so as to avoid a situation that the recognition threshold is inadvertently modified too low to cause a problem that the services of the voice control device are arbitrarily activated when the wakeup keyword is not correctly called (or due to an environmental noise).

It should be noted that in the aforementioned embodiment, the recognition threshold is determined in an average manner, however, the method of modifying the recognition threshold is diversified. For example, weight values are respectively assigned to the confidence values and the recognition threshold, the maximum one of the confidence values subtracting the first variation value is taken as the recognition threshold, etc., which is determined according to an actual requirement of the user, though the adopted method still has to consider the obtained confidence values, so as to avoid multiple trainings of the processor 113.

In this way, the decreased recognition threshold is probably closer to or inferior to the confidence value of the speech data corresponding to the user's call, so as to request for the speech service.

On the other hand, the aforementioned description relates to decrease of the recognition threshold. However, in some cases, the recognition threshold is probably too low, which results in a fact that a confidence value of an environmental sound is higher than the recognition threshold, and the voice control device misjudges to send the service request. In order to decrease occurrence of the above situation, the processor 113 may send the service request to the speech service providing server 150 through the input output interface 112 in response to a determination that the confidence value of the speech data is not inferior to the recognition threshold. The service request includes the speech data obtained by the speech receiving device 111. The speech service providing server 150 determines whether a sentence content recorded by the speech data is matched to the provided speech functions (for example, what's the weather like tomorrow? what is the itinerary in the afternoon? play pop music, etc.), and records a determination result to a service reply corresponding to the service request for sending to the speech service control apparatus 110.

The processor 113 receives the service reply through the input output interface 112, and determines whether the service reply is related to a determination that the speech data is not matched to the speech functions provided by the speech service providing server 150. In response to the service reply being related to a result that the speech data is not matched to the speech functions, it represents that judgement of the confidence value is misjudgement, and the processor 113 modifies the recognition threshold. In the present embodiment, the processor 113 sets a highest threshold, and the highest threshold is determined by the recognition threshold and is greater than the recognition threshold. For example, the highest threshold is equal to the recognition threshold plus a second variation value (which is between 0 and 1, for example, 0.05, 0.03, etc., and is equal to the first variation value in some embodiments). In response to the determination that the confidence value of the speech data is inferior to the highest threshold, the processor 113 may take the confidence value of the speech data as the recognition threshold. Since the confidence value corresponding to a successful service request has to be greater than the recognition threshold, by setting the recognition threshold to the confidence value, the recognition threshold is increased. On the other hand, in response to the determination that the confidence value of the speech data is not inferior to the highest threshold, the processor 113 may take the highest threshold as the recognition threshold, such that the recognition threshold is not modified too high by once. Namely, in the embodiment of the disclosure, by learning the confidence value that cause the misjudgement situation, the recognition threshold is further increased, and the environment sound having such confidence value cannot activate the speech service.

It should be noted that the method for increasing the recognition threshold is diversified, for example, the confidence value plus the second variation value is taken as the recognition threshold, the recognition threshold plus a half of the second variation value is taken as the modified recognition threshold, etc., which is determined according to an actual application requirement.

On the other hand, if the speech data is matched to the speech function, the service reply includes the corresponding speech service (for example, to send weather information, today's itinerary content, music streaming, etc.), and the processor 113 may execute the speech function (for example, to display the weather information, today's itinerary, play music, etc.) corresponding to the speech service.

It should be noted that the speech service control apparatus 110 of the above embodiment is connected to the speech service providing server 150 in a wireless or wired manner. However, in some embodiment, the speech service control apparatus 110 may provide an offline speech service, and the processor 113 may directly determine whether the speech data is matched to the speech function, and accordingly provide the speech service. Namely, the service request and the service reply are all determined through the processor 113, and the input output interface 112 may be omitted.

In order fully convey the spirit of the disclosure to those skilled in the art, another application situation is provided for further description.

Figure 3:
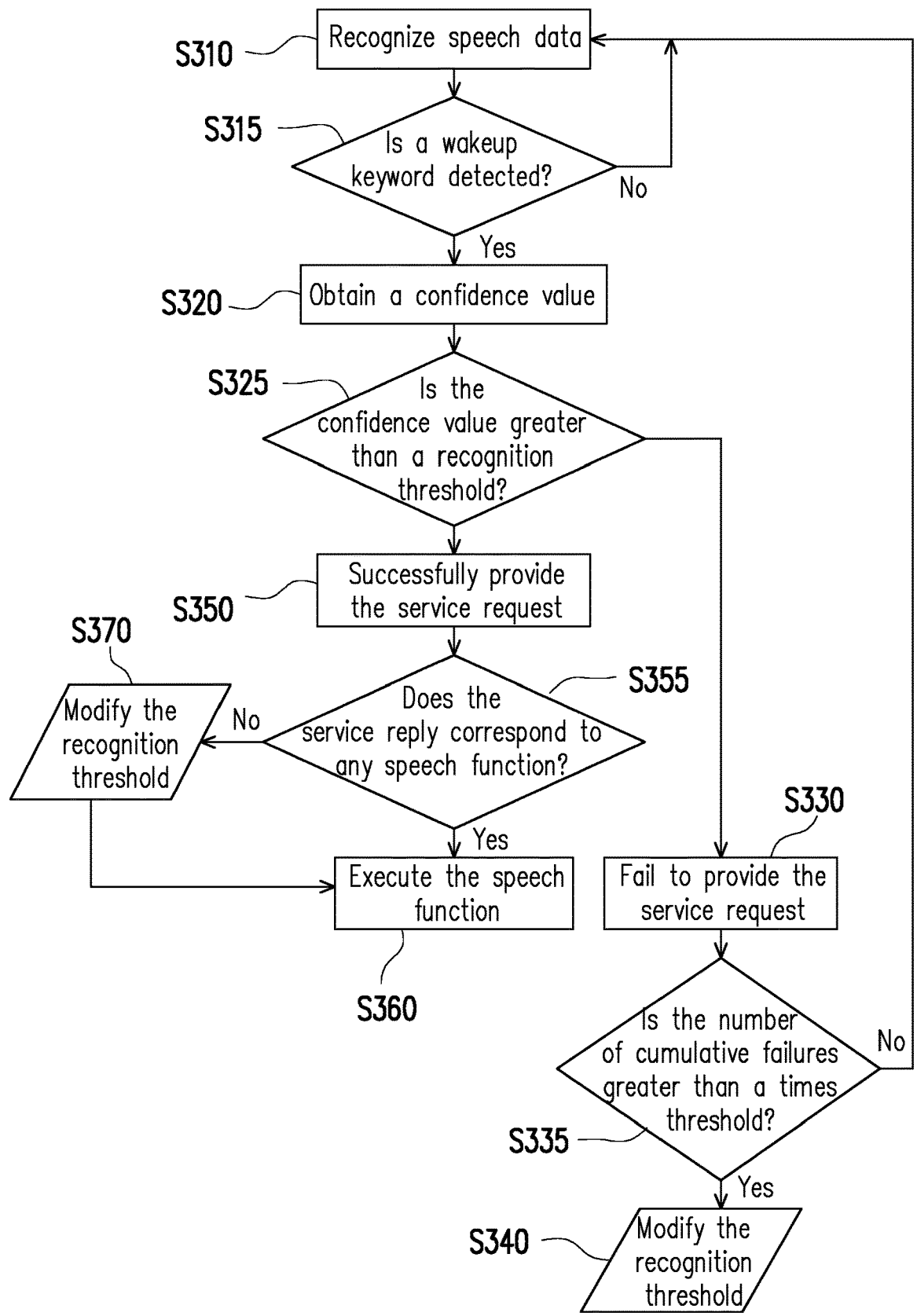
FIG. 3 is a flowchart of an application situation.

Referring to FIG. 3, FIG. 3 is a flowchart of the above application situation, and it is assumed that the recognition threshold is 0.6, the first variation value and the second variation value are all 0.05, and the times threshold is two. The speech receiving device 111 receives a call from the user to produce speech data, and the processor 113 recognizes the speech data (step S310) to determine whether a wakeup keyword is detected (step S315). If the wakeup keyword is not detected, the flow returns to the step S310, and the processor 113 continually recognizes next received speech data. If the wakeup keyword is detected, the processor 113 obtains a confidence value corresponding to the speech data (step S320), and determines whether the confidence value is greater than a recognition threshold (step S325). It is assumed that the confidence value is 0.5, which is not greater than the recognition threshold, it represents that it is unsuccessful (no need) to provide the service request (step S330). The processor 113 further determines whether a number of cumulative failures is greater than the times threshold (step S335), and it is assumed that the number of cumulative failures is 3, the processor 113 then modifies the recognition threshold according to a following equation (1) (step S340):

$$LB = (\max/2(V_i, V_{i-1}, V_{i-2}) + LB)/3 \quad (1)$$

Limited to $LB - \sigma_1 \leq V_i, V_{i-1}, V_{i-2} \leq LB$ Where, LB is the recognition threshold, max/2( ) represents obtaining the largest two, $V_i, V_{i-1}, V_{i-2}$ are respectively confidence values corresponding to the present speech data and the previous speech data of pervious two successful detections of the wakeup keyword, and $\sigma_1$ is the first variation value (i.e. 0.05). For example, the confidence values $V_i, V_{i-1}, V_{i-2}$ are respectively 0.56, 0.55, 0.5, the processor 113 then obtains the confidence values $V_i$ and $V_{i-1}$ (0.56, 0.55 are all greater than or equal to $LB - \sigma_1$), and input the two confidence values $V_i$ and $V_{i-1}$ into the equation (1) to obtain the modified recognition threshold of 0.57 (which is lower than the initial value 0.6).

On the other hand, it is assumed that the confidence value corresponding to the next received speech data is 0.63, which is greater than the modified recognition threshold (0.57), it represents that the processor 113 may successfully provide a service request to the speech service providing server 150 (step S350). The processor 113 receives a service reply through the input output interface 112, and determines whether the service reply corresponds to any speech function (step S355).

It is assumed that the present speech data is coming from the environmental sound, so that it does not correspond to any speech function, the processor 113 then modifies the recognition threshold according to following equations (2) and (3) (step S370):

$$UB = LB + \sigma_2 \quad (2)$$

$$LB = \begin{cases} V, & V < UB \\ UB, & V \geq UB \end{cases} \quad (3)$$

Where, $\sigma_2$ is the second variation value (i.e. 0.05), UB is the highest threshold (i.e. the recognition threshold 0.57 plus the second variation value 0.05 to obtain 0.62), V is the confidence value of the present speech data (i.e. 0.63). Since the confidence value of the present speech data is greater than the highest threshold, the highest threshold is taken as the modified recognition threshold.

On the other hand, if the present speech data is coming from human voice, and the speech data thereof may correspond to one speech function, the processor 113 maintains the recognition threshold, and executes the corresponding speech function (step S360).

In summary, in the speech service control apparatus and the method thereof of the disclosure, it is determined whether the user's several calls for the wakeup keyword are repeatedly failed, and the recognition threshold is decreased according to the calculation relationship of the confidence values corresponding to the failed calls, such that the user may successfully activate the speech service. On the other hand, in order to avoid misjudgment caused by the recognition threshold kept lower than the confidence value corresponding to the environmental sound, the embodiment of the disclosure further determine whether the speech data truly request for the speech function, and increases the recognition threshold in case that the speech data is not matched to the speech function.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A speech service control method, comprising:
obtaining speech data;
recognizing a keyword in the speech data to determine a confidence value corresponding to the keyword, wherein the confidence value is a match level of the keyword relative to a wakeup keyword to request for a speech service;
determining a number of cumulative failures in response to a determination that the confidence value is inferior to a recognition threshold, wherein the speech service is requested when it is determined that the confidence value is greater than the recognition threshold, and the number of cumulative failures is a cumulative number accumulated when the confidence values of the speech data and at least one previous speech data are inferior to the recognition threshold within a time period; and
modifying the recognition threshold according to the number of cumulative failures and a calculation relationship of the confidence values of the speech data and the at least one previous speech data, comprising:
determining an average of at least one selected confidence value and the recognition threshold as the modified recognition threshold, wherein the calculation relationship is the average,
wherein the at least one selected confidence value, which is inferior to the recognition threshold, is at least one of the confidence values of the speech data and the at least one previous speech data.

2. The speech service control method as claimed in claim 1, wherein the step of modifying the recognition threshold according to the number of cumulative failures and the calculation relationship of the confidence values of the speech data and the at least one previous speech data comprises:
determining whether the number of cumulative failures is greater than a times threshold, wherein the times threshold is greater than one; and
decreasing the recognition threshold according to the calculation relationship of the confidence values of the speech data and the at least one previous speech data in response to the determination that the number of cumulative failures is greater than the times threshold.

3. The speech service control method as claimed in claim 1, before the step of determining the average as the modified recognition threshold, the method further comprises:
obtaining at least one maximum confidence value in the confidence values of the speech data and the at least one previous speech data.

4. The speech service control method as claimed in claim 1, before the step of determining the average as the modified recognition threshold, the method further comprises:
obtaining at least one of the confidence values of the speech data and the at least one previous speech data that is greater than a lowest threshold, wherein the lowest threshold is equal to the recognition threshold minus a first variation value.

5. The speech service control method as claimed in claim 1, wherein the number of cumulative failures is a cumulative number accumulated when the confidence values of the speech data and the at least one previous speech data obtained in succession are inferior to the recognition threshold within the time period.

6. The speech service control method as claimed in claim 1, wherein after the step of determining the confidence value corresponding to the keyword, the method further comprises:
sending a service request in response to the determination that the confidence value of the speech data is not inferior to the recognition threshold, wherein the service request comprises the speech data;
receiving a service reply in response to the service request;
determining whether the service reply is related to the speech data not being matched to at least one speech function; and
modifying the recognition threshold in response to determining that the service reply is related to the speech data not being matched to the at least one speech function.

7. The speech service control method as claimed in claim 6, wherein the step of modifying the recognition threshold comprises:
determining a highest threshold according to the recognition threshold, wherein the highest threshold is greater than the recognition threshold; and
increasing the recognition threshold according to the highest threshold.

8. The speech service control method as claimed in claim 7, wherein the step of increasing the recognition threshold according to the highest threshold comprises:
taking the confidence value of the speech data as the recognition threshold in response to the determination that the confidence value of the speech data is inferior to the highest threshold; and
taking the highest threshold as the recognition threshold in response to the determination that the confidence value of the speech data is not inferior to the highest threshold.

9. The speech service control method as claimed in claim 7, wherein the highest threshold is equal to the recognition threshold plus a variation value.

10. A speech service control apparatus, comprising:
a speech receiving device, receiving speech data; and
a processor, coupled to the speech receiving device, and configured to:
recognize a keyword in the speech data to determine a confidence value corresponding to the keyword, wherein the confidence value is a match level of the keyword relative to a wakeup keyword to request for a speech service;
determine a number of cumulative failures in response to a determination that the confidence value is inferior to a recognition threshold, wherein the speech service is requested when the confidence value greater than the recognition threshold is determined, and the number of cumulative failures is a cumulative number accumulated when the confidence values of the speech data and at least one previous speech data are inferior to the recognition threshold within a time period; and
modify the recognition threshold according to the number of cumulative failures and a calculation relationship of the confidence values of the speech data and the previous speech data, wherein
an average of at least one selected confidence value and the recognition threshold is determined as the modified recognition threshold, and the calculation relationship is the average,
wherein the at least one selected confidence value, which is inferior to the recognition threshold, is at least one of the confidence values of the speech data and the at least one previous speech data.

11. The speech service control apparatus as claimed in claim 10, wherein the processor is configured to:

determine whether the number of cumulative failures is greater than a times threshold, wherein the times threshold is greater than one; and decrease the recognition threshold according to the confidence values of the speech data and the at least one previous speech data in response to the determination that the number of cumulative failures is greater than the times threshold.

12. The speech service control apparatus as claimed in claim 10, wherein the processor is configured to:

obtain at least one maximum confidence value in the confidence values of the speech data and the at least one previous speech data.

13. The speech service control apparatus as claimed in claim 10, wherein the processor is configured to:

obtain at least one of the confidence values of the speech data and the at least one previous speech data that is greater than a lowest threshold, wherein the lowest threshold is equal to the recognition threshold minus a first variation value.

14. The speech service control apparatus as claimed in claim 10, wherein the number of cumulative failures is a cumulative number accumulated when the confidence values of the speech data and the at least one previous speech data obtained in succession are inferior to the recognition threshold within the time period.

15. The speech service control apparatus as claimed in claim 10, further comprising:

an input output interface, coupled to the processor, and configured to transceive data; and the processor is configured to:

send a service request through the input output interface in response to the determination that the confidence value of the speech data is not inferior to the recognition threshold, wherein the service request comprises the speech data;

receive a service reply in response to the service request through the input output interface;

determine whether the service reply is related to the speech data not being matched to at least one speech function; and modify the recognition threshold in response to determining that the service reply is related to the speech data not being matched to the at least one speech function.

16. The speech service control apparatus as claimed in claim 15, wherein the processor is configured to:

determine a highest threshold according to the recognition threshold, wherein the highest threshold is greater than the recognition threshold; and increase the recognition threshold according to the highest threshold.

17. The speech service control apparatus as claimed in claim 16, wherein the processor is configured to:

take the confidence value of the speech data as the recognition threshold in response to the determination that the confidence value of the speech data is inferior to the highest threshold; and take the highest threshold as the recognition threshold in response to the determination that the confidence value of the speech data is not inferior to the highest threshold.

18. The speech service control apparatus as claimed in claim 16, wherein the highest threshold is equal to the recognition threshold plus a variation value.

* * * * *